United States Patent
Ewens et al.

(10) Patent No.: US 9,255,525 B2
(45) Date of Patent: Feb. 9, 2016

(54) SYSTEM AND METHOD FOR GAS TURBINE OPERATION

(71) Applicant: General Electric Company, Schenectady, NY (US)

(72) Inventors: David Spencer Ewens, Greer, SC (US); John Rogers Huey, Greenville, SC (US); Marc Gavin Lindenmuth, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 13/691,389

(22) Filed: Nov. 30, 2012

(65) Prior Publication Data

US 2014/0156165 A1   Jun. 5, 2014

(51) Int. Cl.
*F02C 9/00* (2006.01)
*F02C 9/28* (2006.01)
*F02C 9/20* (2006.01)

(52) U.S. Cl.
CPC ... *F02C 9/00* (2013.01); *F02C 9/20* (2013.01); *F02C 9/28* (2013.01); *F05D 2270/053* (2013.01); *F05D 2270/08* (2013.01)

(58) Field of Classification Search
CPC .......... F05D 2260/80; F05D 2270/303; F05D 2270/112; F05D 2270/304; F05D 2230/90; F05D 2260/85; F05D 2230/30; F05D 2270/3032; F02C 9/54; F02C 3/14; F02C 6/003; F02C 6/08; F02C 7/00; F02C 7/06; F02C 7/08; F02C 7/16; F02C 7/222; F02C 7/228

USPC .......... 701/1, 100, 101, 102, 22, 113; 60/773, 60/778, 726, 793, 806
See application file for complete search history.

(56) References Cited

U.S. PATENT DOCUMENTS

| | | | |
|---|---|---|---|
| 4,269,030 A | 5/1981 | Osborne | |
| 5,347,466 A | 9/1994 | Nichols et al. | |
| 6,823,253 B2 * | 11/2004 | Brunell | 701/100 |
| 7,941,281 B2 * | 5/2011 | Rai et al. | 702/34 |
| 8,744,813 B2 * | 6/2014 | Lacaille et al. | 703/2 |
| 8,862,433 B2 * | 10/2014 | Yerramalla et al. | 702/183 |
| 2001/0056315 A1 | 12/2001 | Nagafuchi et al. | |
| 2003/0100974 A1 | 5/2003 | Alvarez et al. | |
| 2003/0131605 A1 * | 7/2003 | Meisner | 60/773 |
| 2004/0030417 A1 * | 2/2004 | Gribble et al. | 700/29 |
| 2004/0102872 A1 * | 5/2004 | Schick et al. | 700/286 |
| 2004/0123600 A1 * | 7/2004 | Brunell et al. | 60/773 |
| 2004/0176901 A1 * | 9/2004 | Uluyol et al. | 701/100 |
| 2004/0237535 A1 * | 12/2004 | Ainsworth | 60/772 |
| 2005/0222747 A1 * | 10/2005 | Vhora et al. | 701/100 |
| 2005/0247064 A1 * | 11/2005 | Lieuwen | 60/773 |
| 2006/0116847 A1 * | 6/2006 | Plotts et al. | 702/136 |

(Continued)

FOREIGN PATENT DOCUMENTS

| | | | |
|---|---|---|---|
| JP | 5145966 A | 6/1993 | |
| JP | 10061412 A | 3/1998 | |

(Continued)

*Primary Examiner* — Truc M Do
(74) *Attorney, Agent, or Firm* — Fletcher Yoder, P.C.

(57) ABSTRACT

A system includes a controller configured to control one or more parameters of a gas turbine engine based on a feedback and a predicted lifespan of one or more components of the gas turbine engine to substantially maintain at least one of power output or heat rate above a threshold level in response to degradation or fouling of the gas turbine engine.

21 Claims, 3 Drawing Sheets

(56) References Cited

U.S. PATENT DOCUMENTS

| | | |
|---|---|---|
| 2006/0195248 A1* | 8/2006 | Kim et al. .................... 701/100 |
| 2006/0217870 A1* | 9/2006 | Hoff et al. .................... 701/100 |
| 2006/0225403 A1* | 10/2006 | Tsuzuki et al. ............ 60/39.281 |
| 2006/0241910 A1* | 10/2006 | Petchenev et al. ............ 702/184 |
| 2007/0051111 A1* | 3/2007 | Uluyol et al. .................. 60/778 |
| 2007/0118270 A1* | 5/2007 | Wiseman et al. ............ 701/100 |
| 2007/0271898 A1 | 11/2007 | Little |
| 2008/0140352 A1* | 6/2008 | Goebel et al. ................ 702/183 |
| 2008/0201104 A1* | 8/2008 | Poncet et al. ................ 702/181 |
| 2009/0012653 A1 | 1/2009 | Cheng et al. |
| 2009/0150040 A1 | 6/2009 | Rofka et al. |
| 2010/0031667 A1 | 2/2010 | Hoffmann et al. |
| 2010/0082267 A1* | 4/2010 | Schimert et al. ................ 702/34 |
| 2010/0089067 A1* | 4/2010 | Wilkes et al. .................... 60/773 |
| 2011/0054965 A1 | 3/2011 | Katagiri et al. |
| 2011/0137575 A1* | 6/2011 | Koul ................................ 702/34 |
| 2012/0060505 A1* | 3/2012 | Fuller et al. .................... 60/773 |
| 2013/0024179 A1* | 1/2013 | Mazzaro et al. ................ 703/18 |

FOREIGN PATENT DOCUMENTS

| | | |
|---|---|---|
| JP | 10187211 A | 7/1998 |
| JP | 11182263 A | 7/1999 |
| WO | 2011080548 A1 | 7/2011 |

* cited by examiner

SYSTEM AND METHOD FOR GAS TURBINE OPERATION

BACKGROUND OF THE INVENTION

The subject matter disclosed herein relates to gas turbine engines, and more specifically, to system and methods for maintaining certain gas turbine operational characteristics over the product life of a gas turbine engine.

Gas turbine engines generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases flow against and around turbine blades of the turbine, thereby driving rotation of the turbine and any external load. The external load may include an electrical generator. As the gas turbine engine operates, components may degrade and/or foul, resulting in reduced performance over the life of the system. The reduced performance may be in the form of reduced gas turbine engine output and/or efficiency and increased operating costs.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller configured to control one or more parameters of a gas turbine engine based on a feedback and a predicted lifespan of one or more components of the gas turbine engine to substantially counter the reduction of at least one of power output or efficiency above a threshold level in response to degradation of the gas turbine engine.

In a second embodiment, a method includes operating a gas turbine engine and determining a base output value based on base load operation of the gas turbine engine under new and clean conditions. The method also includes obtaining a corrective parameter and determining a target output value based at least in part on the base output value and the corrective parameter. Additionally, the method includes monitoring an output value of the gas turbine engine, comparing the output value to the target output value, and adjusting one or more operating conditions of the gas turbine engine such that a difference between the output value and the target output value is less than a threshold value. The difference between the output value and the target output value is caused at least partially by degradation and/or fouling of the gas turbine engine, as compared to new and clean conditions.

In a third embodiment, a method includes operating a gas turbine engine and determining a base output value based on base load operation of the gas turbine engine. The method also includes determining a predicted lifespan of one or more components of the gas turbine engine at the base load, determining a target lifespan of a first component of the gas turbine engine, and determining a calculated output value based at least in part on the base output value and the target lifespan. Further, the method includes monitoring an output value of the gas turbine engine, comparing the output value to the calculated output value, and adjusting one or more operating conditions of the gas turbine engine, such that a difference between the output value and the calculated output value is less than a threshold value.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION OF THE INVENTION

Figure 1:
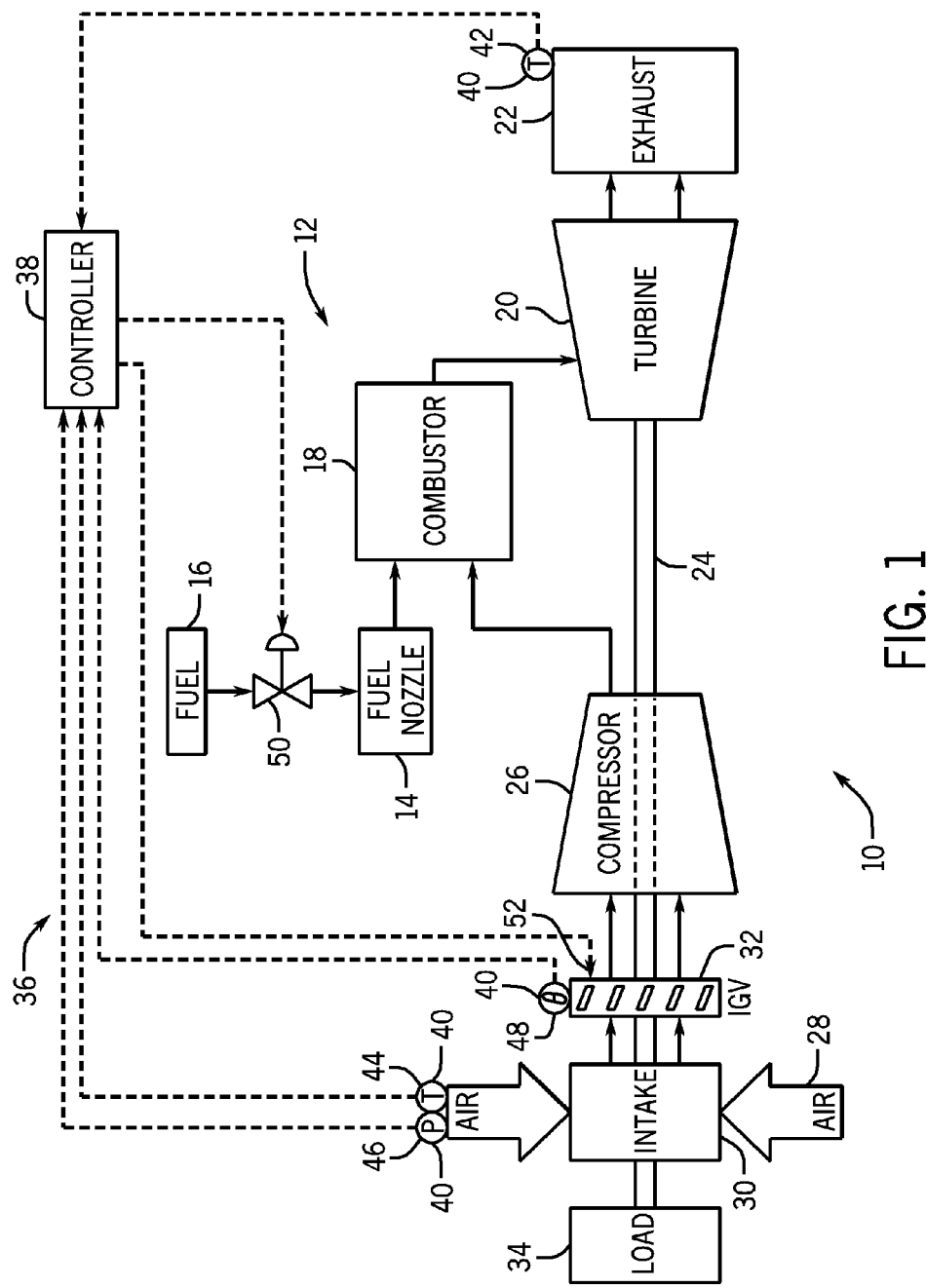
FIG. 1 is a schematic block diagram of an embodiment of a gas turbine system incorporating a system and method to maintain desired gas turbine system operational characteristics over the product life.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for maintaining an output value of a gas turbine engine with respect to a product life of a component of the gas turbine engine. In a new and clean state, the gas turbine engine typically produces the most favorable outputs, which may be referred to as a base output values. To preserve gas turbine engine efficiency and cost effectiveness, it may be desirable to maintain operation of the gas turbine engine at, or approximately at, the base output value(s). At least one corrective parameter, generally based on environmental conditions, may be applied to the base output value to determine a target output value for the turbine of the gas turbine engine. The target output value may be maintained throughout the product life of the gas turbine engine by adjusting at least one operating condition of the gas turbine engine.

For example, output values that may be monitored and maintained may include, but are not limited to, power output, heat rate, or a combination thereof. The power output of the gas turbine engine may be electrical power output created as the shaft rotates and may be measured in Watts. The heat rate of the gas turbine is similar to an efficiency measurement, as it compares the energy value of fuel going into the gas turbine to power output by the gas turbine (e.g., heat rate is equal to the fuel flow rate multiplied by the fuel heating value and divided by the power output of the gas turbine). Further, operating conditions that may be adjusted may include, but are not limited to, firing temperature, exhaust temperature, fuel flow rate, fuel composition (e.g., one or more fuels), fuel heating value, oxygen content of oxidant (e.g., air, oxygen enriched air, oxygen reduced air, or pure oxygen), fuel-air ratio, fuel temperature, combustion dynamics, emissions flow rate, inlet guide vane angle, or a combination thereof. In this manner, the output value of the gas turbine engine may be maintained at approximately the base output target value to increase system efficiency, without negatively affecting the product life or maintenance schedule of the system. However, in alternative embodiments, the operating conditions of the gas turbine engine may be adjusted such that the output value of the gas turbine engine is sufficiently greater or less than the target output value in order to comply with product life or maintenance schedule requirements of the gas turbine engine. For example, if a maintenance shutdown of a gas turbine engine component is scheduled prior to the end of the product life of the turbine, the operating conditions of the gas turbine engine may be adjusted such that the output value exceeds the base output target value with no maintenance impact. In this way, the maximum power output and/or heat rate may be derived from the gas turbine engine prior to the scheduled outage. The gas turbine engine may incorporate a controller and one or more sensors to monitor and adjust output values and operating conditions of the gas turbine engine.

Turning now to the drawings, FIG. 1 illustrates a block diagram of an embodiment of a gas turbine system 10 having a gas turbine engine 12. As discussed below, the system 10 includes a control system 36 configured to monitor and control aspects of the gas turbine engine 12 to counter degradation and/or reduction in performance, and specifically maintain base load output, heat rate, and various other outputs in response to monitored feedback. The gas turbine system 10 may use liquid or gaseous fuel, such as natural gas and/or a synthetic gas, to drive the gas turbine system 10. As depicted, one or more fuel nozzles 14 may intake a fuel supply 16. Each fuel nozzle 14 then mixes the fuel with an oxidant (e.g., air) and may distribute the fuel-air mixture into a combustor 18. Multiple combustors 18 may be arranged circumferentially about the gas turbine engine 12. Further mixing occurs between the fuel and air within the combustors 18. Although shown schematically as being outside or separate from the combustors 18, the fuel nozzles 14 may be disposed inside the combustors 18. The fuel-air mixture combusts in a chamber within the combustors 18, thereby creating hot, pressurized combustion gases. The combustors 18 direct the combustion gases through a turbine 20 and toward an exhaust outlet 22. As the combustion gases pass through the turbine 20, the gases force blades within the turbine 20 to rotate a shaft 24 along a longitudinal axis of the gas turbine system 10.

As illustrated, the shaft 24 is connected to various components of the gas turbine system 10, including a compressor 26. The compressor 26 also includes compressor blades coupled to the shaft 24. As the shaft 24 rotates, the compressor blades within the compressor 26 also rotate, thereby compressing ambient air 28 from an air intake 30. The air intake 30 may feed the ambient air 28 through a series of inlet guide vanes (IGVs) 32, which control the amount of ambient air 28 that is conveyed into the compressor 26. The IGVs 32 may be disposed at an angle that can be increased or decreased to allow less or more ambient air 28 into the compressor 26. The shaft 24 may also be coupled to a load 34, which may be a vehicle or a stationary load, such as an electrical generator in a power plant or a propeller on an aircraft, for example. The load 34 may include any suitable device capable of being powered by the rotational output of turbine system 10.

The control system 36 may be used to control the operation of the gas turbine engine 12 to increase the operating efficiency of the gas turbine system 10. For example, the control system 36 may be used to monitor and adjust various parameters of the gas turbine engine 12. Particularly, a controller 38 may include instructions stored on a non-transitory, machine-readable medium (e.g., memory 37) and executable on one or more processors 39. The controller 38 may also communicate with multiple sensors 40 to monitor aspects of the gas turbine engine 12. In certain embodiments, the controller 38 may include an industrial controller 38, such as a double or triple redundant controller with 2, 3, or more processors 39. For example, the processors 39 may include general-purpose or application-specific microprocessors. In some embodiments, the controller 38 may include an application-specific or general purpose computer. Likewise, the memory 37 may include volatile and/or non-volatile memory, random access memory (RAM), read only memory (ROM), flash memory, hard disk drives, removable disk drives and/or removable disks (e.g., CDs, DVDs, BluRay disks, USB pen drives, etc.), or any combination thereof. Regardless of the specific components, instructions stored on the memory 37 may be specifically designed to carry out various monitoring, analysis, and control functions of the disclosed embodiments. In the depicted embodiment, the controller 38 may interact with the sensors 40, which include an exhaust temperature sensor 42, an ambient air temperature sensor 44, an ambient air pressure sensor 46, and an IGV angle sensor 48. Further, the controller 38 may interact with an actuated valve 50 and an IGV actuator 52 to adjust operation of the gas turbine engine 12, as described in detail below.

Figure 2:
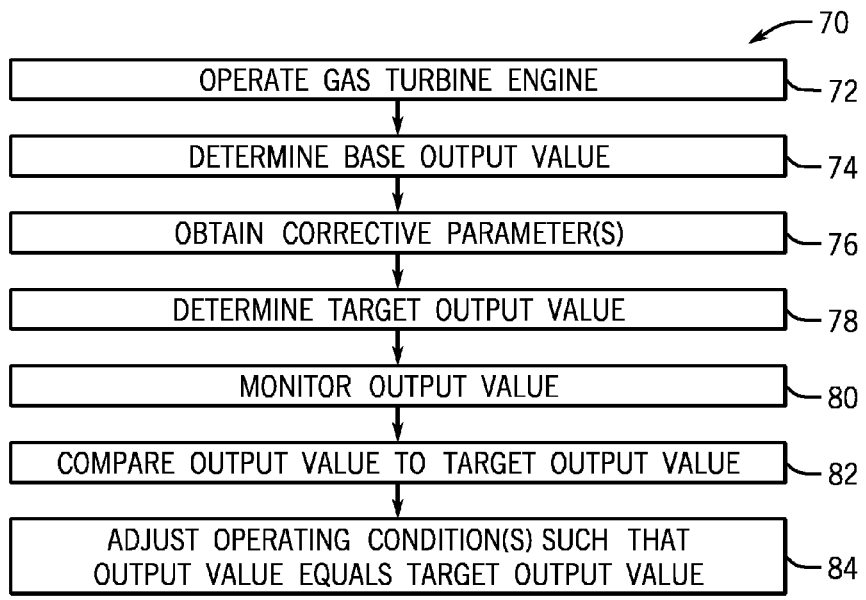
FIG. 2 is a flow diagram of an embodiment of a method for maintaining an output of the gas turbine system of FIG. 1.

FIG. 2 is a flow diagram depicting a method 70 for maintaining the output of the gas turbine engine 12 throughout the product life of the gas turbine engine 12 (as established by an operator, manufacturer, etc.), thereby improving the efficiency of the gas turbine engine 12. In certain embodiments, the method 70 may include instructions or code stored on the memory 37 and executable by the processor 39 of the controller 38. Thus, each step of the method 70 may include such instructions or code, and may also employ sensor feedback, mathematical algorithms, computer/mathematical models, historical data and trends, look-up tables, knowledge based data, expert data, market/pricing data, etc. As previously mentioned, the gas turbine engine 12 may produce a maximum output as a new and/or clean unit. However, throughout the product life of the gas turbine engine 12, internal components of the gas turbine engine 12 may degrade, resulting in decreasing output and efficiency. Thus, during initial operation of the gas turbine engine 12 (block 72), a base output value may be determined that corresponds to the output value of the turbine during new and/or clean operation (block 74). For example, the base output value may be the power output and/or heat rate. The base output value may be stored in the control system 36 (e.g., in the memory 37) to be compared to output values obtained as the gas turbine engine 12 degrades/ fouls throughout its operation.

To improve the accuracy of the control system 36, several corrective parameters may be obtained (e.g., by the sensors 40) (block 76). The corrective parameters may be used with information (e.g., mathematical formula, data, trends, historical data, computer models, knowledge based data, expert data, etc.) and instructions stored in the control system 36 (e.g., in the memory 37) to compensate for tendencies of the gas turbine engine 12 and the effects of the environment on the gas turbine engine 12. Such corrective parameters may include a temperature of the ambient air 28 measured with the temperature sensor 44, a pressure of the ambient air 28 measured with the pressure sensor 46, a humidity of the ambient air 28, an inlet temperature of the compressor 26, a pressure loss of the gas turbine engine 12, and/or a pressure loss of the exhaust 22. For example, corrective parameters may be considered on cold days when the air is more dense and the mass flow rate through the turbine 20 is naturally increased, thereby decreasing the requirements from the compressor 26 and/or combustor 18.

A target output value may be determined based on the base output value and at least one corrective parameter (block 78). Further, the target output value may incorporate the consideration of the product life of the gas turbine engine 12 as provided by the operator, manufacturer, and so forth. In this way, the method 70 may be employed to enable the gas turbine engine 12 to generate the target output value throughout its entire operation (i.e., no degradation in performance) without affecting the product life and/or maintenance schedule of the gas turbine engine 12. As the gas turbine engine 12 is in operation, the control system 36 may monitor an output value (e.g., an actual output value) (block 80). The monitored output values may be the power output and/or heat rate in order to be comparable to the base and target output values. The control system 36 may be encoded to compare the output values obtained during operation to the target output value determined from the base output value (e.g., based on new and/or clean operation) (block 82). During operation, when the control system 36 senses that a difference between the output value and the target output value is greater than a threshold value, at least one operating condition of the gas turbine engine 12 may be adjusted such that the output value of the gas turbine engine 12 may be approximately equal to the target output value (block 84). In other words, the operating conditions may be adjusted to increase the output value of the gas turbine engine 12 to be kept relatively constant and approximately equal to the base output value, resulting in increased total output and efficiency of the gas turbine engine 12 over time.

The adjustable operating conditions may include a firing temperature in the combustor 18, a temperature of the exhaust 22 measured by the temperature sensor 42, a fuel flow rate as controlled by valve 50, fuel composition (e.g., one or more fuels), fuel heating value, oxygen content of oxidant (e.g., air, oxygen enriched air, oxygen reduced air, or pure oxygen), fuel-air ratio, fuel temperature, combustion dynamics, an emissions flow rate, an angle of the IGVs 32 as controlled by the IGV actuator 52, or a combination thereof. For example, when the output value is less than the target output value, the control system 36 may provide instructions for increasing the firing temperature in the combustor 18 in order to increase the energy of the combustion gases entering the turbine 20, thereby increasing the power output of the gas turbine engine 12. Alternatively, the controller 38 may provide for an increase in the temperature measured at the exhaust 22, which may also generally result from increasing the firing temperature. Further, the control system 36 may open the actuated valve 50 to increase the firing temperature by increasing the flow rate of fuel sent to the combustor 18. The control system 36 may also increase the amount of oxidant supplied to the combustor 18 (e.g., to increase the total mass flow through the turbine) by using the IGV actuator 52 to open the IGVs 32. The operation of the gas turbine engine 12 may be substantially maintained such that the output value (e.g., heat rate and/or power output) approximately matches the target output value. Operating limits (e.g., pressure, temperature, etc.) of the gas turbine engine 12 components may limit the allowable range for the adjustable operating conditions to protect against accelerated component degradation and preserve product life. For example, the combustor 18 materials may limit the maximum firing temperature. Additionally, the IGVs 32 and the actuated valve 50 have fully-open positions that are geometrically and/or physically imposed and cannot be exceeded. Although previously described with respect to increasing the output value of the gas turbine engine 12, the above adjustments may be applied to decrease the output value, such as on a cold day as previously described.

Figure 3:
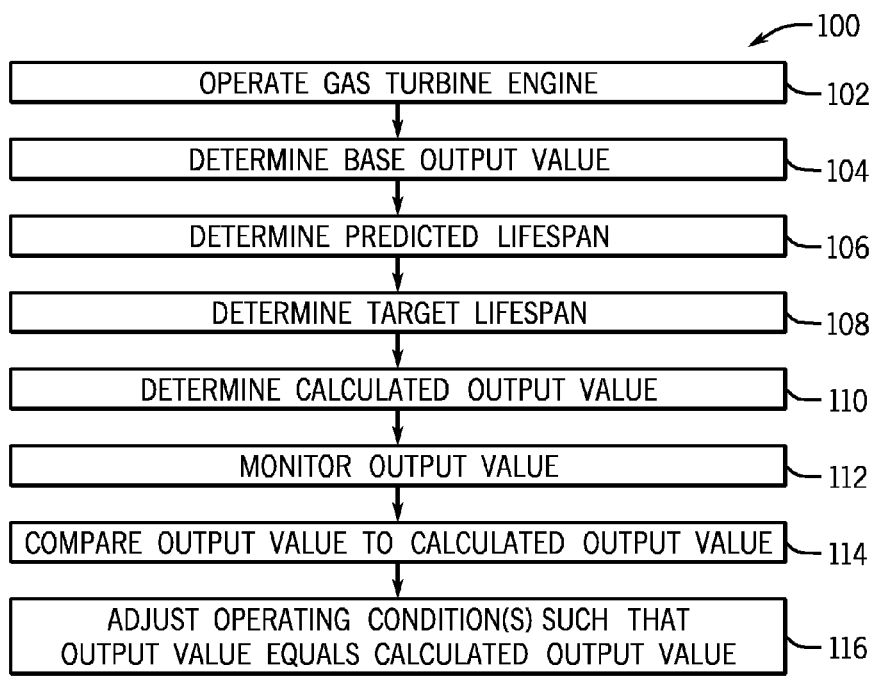
FIG. 3 is a flow diagram of an embodiment of a method for maintaining a product life of a component of the gas turbine system of FIG. 1.

FIG. 3 is a flow diagram depicting a method 100 for operating the turbine 20 based on product life of components of the gas turbine engine 12, thereby improving the efficiency and total power generation of the gas turbine engine 12. In certain embodiments, the method 100 may include instructions or code stored on the memory 37 and executable by the processor 39 of the controller 38. Thus, each step of the method 100 may include such instructions or code, and may also employ sensor feedback, mathematical algorithms, computer/mathematical models, historical data and trends, look-up tables, knowledge based data, expert data, market/pricing data, etc. For example, if a component of the gas turbine engine 12 requires a maintenance outage before the turbine 20 (or any different component of the gas turbine engine 12) requires a maintenance outage, the turbine 20 will have excess product life that may be traded for increased output. Therefore, the gas turbine engine 12 may be operated above the target output value, which shortens the product life of the turbine 20. In this way, a maximum amount of output may be derived from the turbine 20 prior to the scheduled outage of the gas turbine engine 12 by sacrificing the excess product life. Further, in some embodiments, the method 100 may be utilized by the operator of the gas turbine engine 12 to simply adjust the product life and/or maintenance schedule based on an increased customer demand, such as a power demand, real time pricing of electricity, outages of other power plants, etc. Alternatively, the method 100 may be employed to extend the product life of the gas turbine engine 12 to postpone an outage. In such an embodiment, the gas turbine engine 12 may be operated below the target output value to enable an extended product life and period of operation. For example, if the turbine 20 is scheduled for an outage a few weeks prior to an entire system 10 outage, the gas turbine engine 12 may be operated below the target output value in order to extend the useable life of the turbine 20 to equal that of the system 10.

The gas turbine engine 12 may be initially operated (block 102) to determine the base output value (block 104). As described previously, the base output value may be based on new and/or clean operation of the gas turbine engine 12 to obtain a maximum output value as the base output value. The base output value may be the power output and/or efficiency of the gas turbine engine 12. Using the base output value, a predicted lifespan (e.g., product life model) of the gas turbine engine 12 may be determined (block 106) based on the product life of a component of the gas turbine engine 12. In general, the manufacturer may provide a recommendation of the predicted lifespan of the gas turbine engine 12 at the base output value. Further, a target lifespan for the gas turbine engine 12 may be determined (block 108). In certain embodiments, the target lifespan may be based on the product life of a component in the gas turbine engine 12. For example, the gas turbine engine 12 may be scheduled for a shutdown due to a maintenance outage of the compressor 26 that precedes the maintenance date of the other components of the gas turbine engine 12, thus the maintenance outage of the compressor 26 may dictate the target lifespan of the gas turbine engine 12.

A calculated output value for the gas turbine engine 12 may be determined (block 110) based at least partially on the target lifespan and the base output value. For example, if the target lifespan of the gas turbine engine 12 is shorter than the predicted lifespan of the turbine 20, the calculated output value may be greater than the base output value in order to maximize the total output supplied by the gas turbine engine 12. In other words, the lifespan of the turbine 20 may be decreased by operating the gas turbine engine 12 above the base output value. Therefore, the excess product life (e.g., predicted lifespan minus target lifespan) of the turbine 20 is exchanged for increased total output. The calculated output value may be the power output and/or efficiency, as it relates to the base output value. As the gas turbine engine 12 operates, an output value actually provided by the gas turbine engine 12 may be monitored (block 112). The control system 36 may compare the output value (e.g., actual output value) to the calculated output value (block 114). Further, the controller 38 may provide instructions to adjust at least one operating condition of the gas turbine engine 12, such that the difference between the output value and the calculated output value is less than a threshold value (block 116). The operating conditions may be adjusted in any combination as described above with respect to FIG. 2.

Figure 4:
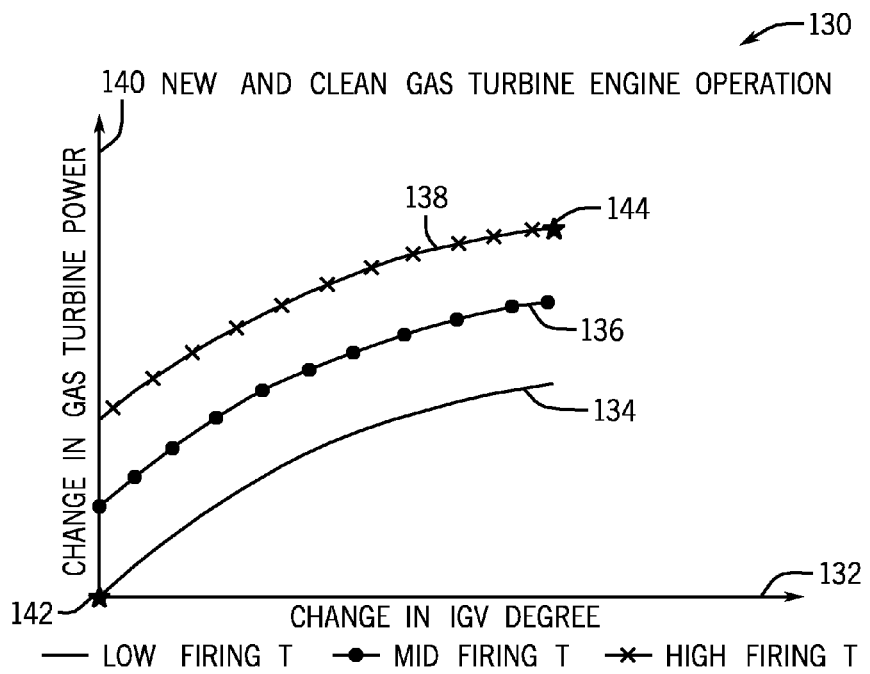
FIG. 4 is a plot showing change in gas turbine power as a function of change in inlet guide vane (IGV) degree and firing temperature.

FIG. 4 is a plot 130 depicting change in the power output of the gas turbine engine 12 as a function of change in the degree of the IGVs 32 and firing temperature. The plot 130 depicts how changes in the angle of the IGVs 32 and the firing temperature within the combustor 18 may affect the power output of the gas turbine engine 12. The x-axis 132 represents a first variable (e.g., operating condition), namely change in the angle of the IGVs 32, with the change in angle increasing toward the right end of the x-axis 132 (e.g., the IGVs 32 are more open toward the right). The second variable (e.g., operating condition), namely change in firing temperature, is shown with a series of lines within the plot 130. The plain line 134 represents a low firing temperature, the dotted line 136 represents a mid firing temperature, and the line marked with x's 138 represents a high firing temperature. The y-axis 140 represents the resultant change in gas turbine engine 12 power output as a factor of the variables.

The plot 130 exhibits a simple trend for the power output of the gas turbine engine 12 with respect to the variables. For example, as the change in the angle of the IGV 32 increases (e.g., as the IGVs approach the fully-open position), the power output supplied by the gas turbine engine 12 increases. Similarly, as the firing temperature in the combustor 18 increases, the power output of the gas turbine engine 12 increases. Thus, opening the IGVs 32 and increasing the firing temperature within the combustor 18 may be effective methods of counteracting degradation of the gas turbine engine 12 over time in an effort to maintain power output. It may be desirable to note certain points on the plot 130. Particularly, points 142 and 144 represent important values with respect to operation of the gas turbine engine 12. Point 142 corresponds to the base firing temperature and base angle of the IGVs 32, indicating the base output value (e.g., gas turbine engine 12 power or efficiency) of the gas turbine engine 12 when it is initially operated in new and/or clean condition. Point 144 corresponds to a high firing temperature and a large change in the angle of the IGVs 32, resulting in an increased power output potential for the gas turbine engine 12 in a new and clean state. Generally, as the gas turbine engine 12 operates throughout its product life, the variables (e.g., operating conditions) may be adjusted in any combination to utilize this power potential to counteract the power loss due to degradation and/or fouling of the gas turbine engine 12. Further, additional operating conditions may be adjusted, as previously described.

Figure 5:
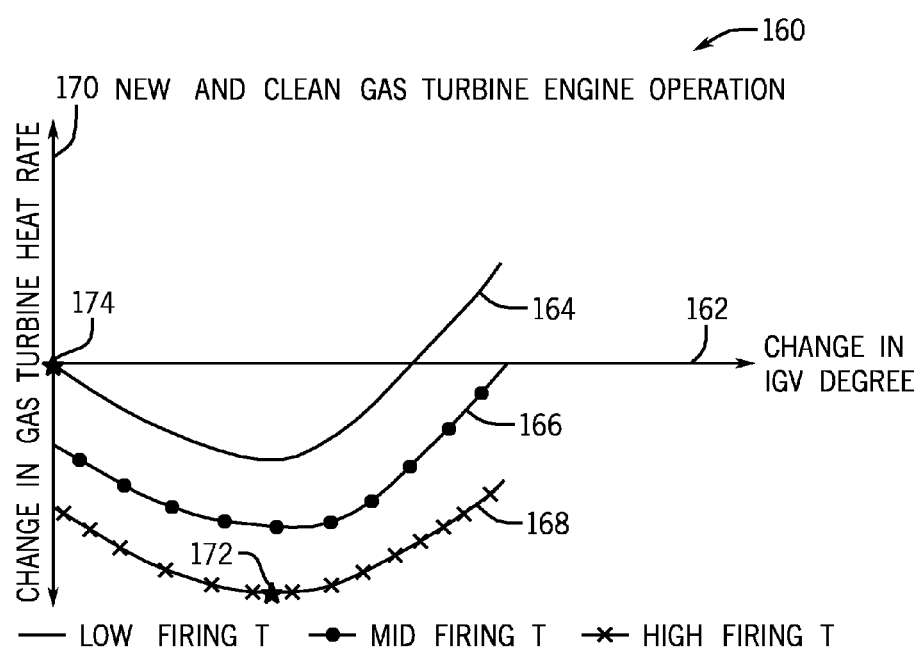
FIG. 5 is a plot showing change in gas turbine heat rate as a function of change in inlet guide vane (IGV) degree and firing temperature.

FIG. 5 is a plot 160 depicting change in the heat rate of the gas turbine engine 12 as a function of change in degree of the IGVs 32 and the firing temperature. The plot 160 depicts how changes in the angle of the IGVs 32 and the firing temperature within the combustor 18 may affect the heat rate of the gas turbine engine 12. The x-axis 162 represents a first variable (e.g., operating condition), namely change in the angle of the IGVs 32, with the change in angle increasing toward the right end of the x-axis 162 (e.g., the IGVs 32 are more open toward the right). The second variable (e.g., operating condition), namely change in firing temperature, is shown with a series of lines within the plot 160. The plain line 164 represents the base low firing temperature, the dotted line 166 represents a mid firing temperature, and the line marked with x's 168 represents a high firing temperature. The y-axis 170 represents the resultant change in the heat rate of the gas turbine engine 12 as a factor of the variables.

The plot 160 exhibits a trend for the heat rate of the gas turbine engine 12 (e.g., energy supplied by fuel compared to power output by the gas turbine engine 12) with respect to the variables. For example, as the change in the degree of the IGVs 32 increases, the heat rate of the gas turbine engine 12 may exhibit a U-shape. Thus, opening the IGVs 32 may be an effective method of counteracting degradation of the gas turbine engine 12 until an inflection point 172 of the curve is reached. After the inflection point 172 is reached, opening the IGVs 32 may be detrimental to the heat rate of the gas turbine engine 12. As such, the inflection point 172 may indicate the best achievable heat rate value for the gas turbine engine 12 at a given firing temperature. Point 174 corresponds to the base firing temperature and base IGV 32 angle, indicating the base output value of the gas turbine engine 12 when it is initially operated in a new and clean state. Generally, as the gas turbine engine 12 operates throughout its product life, the variables (e.g., operating conditions) may be adjusted in any combination to utilize this power potential to counter the power loss due to degradation and/or fouling of the gas turbine engine 12. Further, the trends in FIG. 4 and FIG. 5 may be considered and applied simultaneously to provide a robust control strategy. Further, additional operating conditions may be adjusted to influence the operation of the gas turbine engine 12.

Technical effects of the invention include maintaining an output value of a gas turbine engine 12 with respect to a product life of the components of the gas turbine engine 12. The gas turbine engine 12 produces a maximum output and operates at a maximum efficiency when new and/or clean, which is referred to as the base output value. To preserve the gas turbine engine 12 efficiency and cost effectiveness, it may be desirable to maintain operation of the gas turbine engine 12 at this base output value. Corrective parameters, generally based on environmental and/or system conditions, may be applied to the base output value to determine a target output value for the gas turbine engine 12. The target output value of the gas turbine engine 12 may be maintained throughout the product life by adjusting at least one operating condition of the gas turbine engine 12 with the aid of the control system 36. For example, output values that may be monitored and maintained may include power output, heat rate, or a combination thereof. Further, operating conditions that may be adjusted may include firing temperature in the combustor 18, a temperature of the exhaust 22 measured by the temperature sensor 42, a fuel flow rate as controlled by valve 50, fuel composition (e.g., one or more fuels), fuel heating value, oxygen content of oxidant (e.g., air, oxygen enriched air, oxygen reduced air, or pure oxygen), fuel-air ratio, fuel temperature, combustion dynamics, an emissions flow rate, an angle of the IGVs 32 as controlled by the IGV actuator 52, or a combination thereof. In this manner, the output value of the gas turbine engine 12 may be maintained at approximately the base output value to increase the gas turbine engine 12 output and/or efficiency. By limiting the allowable adjustment range, the product life or maintenance schedule of the gas turbine engine 12 may be minimally impacted. However, in alternative embodiments, the operating conditions of the gas turbine engine 12 may be adjusted such that the output value of the gas turbine engine 12 is sufficiently different than the target output value in order to comply with product life or maintenance schedule requirements of a different component in the gas turbine engine 12. For example, if a shutdown is scheduled prior to the end of the turbine 20 product life, the operating conditions of the gas turbine engine 12 may be adjusted such that the output value exceeds the base output value. In this way, maximum power output and/or heat rate may be derived from the gas turbine engine 12 prior to the scheduled outage of the gas turbine engine 12. The gas turbine system 10 may incorporate a controller 38 and multiple sensors 40 to monitor and adjust the output values and operating conditions of the gas turbine system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a controller configured to control one or more parameters of a gas turbine engine based on a feedback and a predicted lifespan of one or more components of the gas turbine engine, wherein the controller comprises instructions disposed on a non-transitory, machine readable medium, wherein the instructions are configured to:
operate the gas turbine engine;
determine a base power output, a base heat rate, or a combination thereof based on new and clean operation of the gas turbine engine at base load;
obtain a corrective parameter;
determine a target power output, a target heat rate, or a combination thereof based at least in part on the base power output, the base heat rate, or a combination thereof and the corrective parameter;
monitor a power output, a heat rate, or a combination thereof of the gas turbine engine;
compare the power output to the target power output, compare the heat rate to the target heat rate, or a combination thereof;
adjust the one or more parameters of the gas turbine engine such that a difference between the power output and the target power output, the heat rate and the target heat rate, or a combination thereof is less than a threshold value, wherein the difference between the power output and the target power output, the heat rate and the target heat rate, or the combination thereof is caused at least partially by degradation and/or fouling of the gas turbine engine;
determine at least one base output value based on the base load of the gas turbine engine;
determine at least one predicted lifespan of at least one component of the gas turbine engine at the base load;
determine at least one target lifespan of one or more components of the gas turbine engine;
determine at least one calculated output value based at least in part on the at least one base output value and the at least one target lifespan;
monitor at least one output value of the gas turbine engine;
compare the at least one output value to the at least one calculated output value; and
adjust at least one operating condition of the gas turbine engine such that at least one difference between the at least one output value and the at least one calculated output value is less than at least one threshold value.

2. The system of claim 1, wherein at least one of the power output or heat rate is within approximately 10% of the base output value, wherein the base output value is based on a base output value of the gas turbine engine new and clean.

3. The system of claim 1, wherein the controller is configured to control operation of a power plant that includes the gas turbine engine.

4. The system of claim 1, wherein the controller comprises a memory and at least one processor.

5. The system of claim 1, comprising a sensor configured to generate an input signal to the controller, wherein the input signal is indicative of the parameters of the gas turbine engine.

6. The system of claim 5, wherein the sensor comprises at least one of an ambient temperature sensor, an ambient pressure sensor, an ambient humidity sensor, a compressor inlet temperature sensor, an inlet pressure sensor, or an exhaust pressure sensor, or a combination thereof.

7. The system of claim 1, comprising an actuator configured to adjust an operating condition of the gas turbine engine.

8. The system of claim 7, wherein the actuator comprises at least one of an inlet guide vane actuator, or a fuel flow control valve actuator, or a combination thereof.

9. A method, comprising:
operating a gas turbine engine;
determining a base output value based on new and clean operation of the gas turbine engine at base load;
obtaining a corrective parameter;
determining a target output value based at least in part on the base output value and the corrective parameter;
monitoring an output value of the gas turbine engine;
comparing the output value to the target output value; and
adjusting an operating condition of the gas turbine engine such that a difference between the output value and the target output value is less than a threshold value, wherein the difference between the output value and the target output value is caused at least partially by degradation and/or fouling of the gas turbine engine;
determining at least one base output value based on the base load of the gas turbine engine;
determining at least one predicted lifespan of at least one component of the gas turbine engine at the base load;
determining at least one target lifespan of one or more components of the gas turbine engine;

determining at least one calculated output value based at least in part on the at least one base output value and the at least one target lifespan;

monitoring at least one output value of the gas turbine engine;

comparing the at least one output value to the at least one calculated output value; and adjusting at least one operating condition of the gas turbine engine such that at least one difference between the at least one output value and the at least one calculated output value is less than at least one threshold value.

10. The method of claim 9, wherein the output value comprises at least one of a power output, or a heat rate, or a combination thereof.

11. The method of claim 9, wherein the base output value corresponds to operation of a new gas turbine engine, or a clean gas turbine engine, or a combination thereof.

12. The method of claim 9, wherein the corrective parameter comprises at least one of an ambient temperature, an ambient pressure, an ambient humidity, a compressor inlet temperature, an inlet pressure loss, or an exhaust pressure loss, or a combination thereof.

13. The method of claim 9, wherein the operating condition comprises at least one of a firing temperature, an exhaust temperature, a fuel flow rate, an emissions flow rate, or an inlet guide vane angle, or a combination thereof.

14. The method of claim 9, comprising maintaining the operating condition less than a maximum operating condition.

15. The method of claim 14, wherein the maximum operating condition is based at least in part on a predicted lifespan of a component of the gas turbine engine at the base load.

16. A method, comprising:
operating a gas turbine engine;
determining a base output value based on a base load of the gas turbine engine;
determining a predicted lifespan of a first component of the gas turbine engine at the base load;
determining a target lifespan of one or more components of the gas turbine engine;
determining a calculated output value based at least in part on the base output value and the target lifespan;
monitoring an output value of the gas turbine engine;
comparing the output value to the calculated output value; and
adjusting an operating condition of the gas turbine engine such that a difference between the output value and the calculated output value is less than a threshold value.

17. The method of claim 16, wherein the target lifespan is based on at least one predicted shutdown of the gas turbine engine.

18. The method of claim 17, wherein the predicted shutdown of the gas turbine engine is based on a replacement or repair of a second component of the gas turbine engine different from the first component.

19. The method of claim 16, wherein the target lifespan is less than the predicted lifespan.

20. The method of claim 16, wherein the calculated output value is greater than the base output value.

21. The method of claim 16, comprising:
determining at least one base output value based on new and clean operation of the gas turbine engine at the base load;
obtaining at least one corrective parameter;
determining at least one target output value based at least in part on the at least one base output value and the at least one corrective parameter;
monitoring at least one output value of the gas turbine engine;
comparing the at least one output value to the at least one target output value; and
adjusting at least one operating condition of the gas turbine engine such that at least one difference between the at least one output value and the at least one target output value is less than at least one threshold value, wherein the at least one difference between the at least one output value and the at least one target output value is caused at least partially by degradation and/or fouling of the gas turbine engine.

\* \* \* \* \*